R. S. BEAVER.
SWIVEL SNAP.
APPLICATION FILED MAY 14, 1909.
947,539.
Patented Jan. 25, 1910.
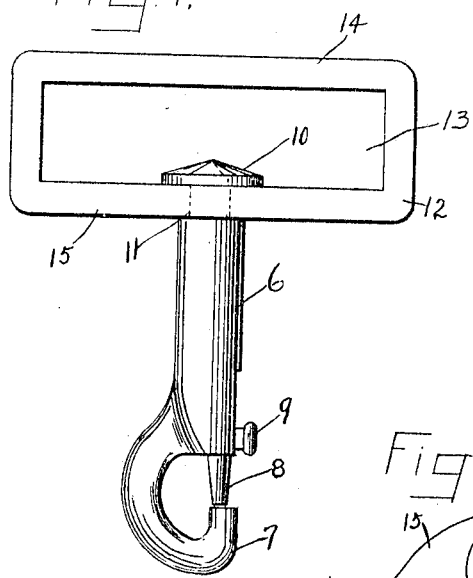
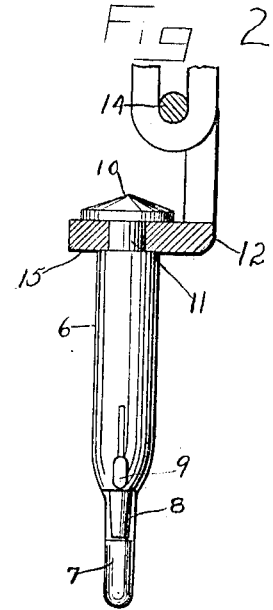
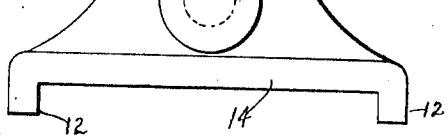
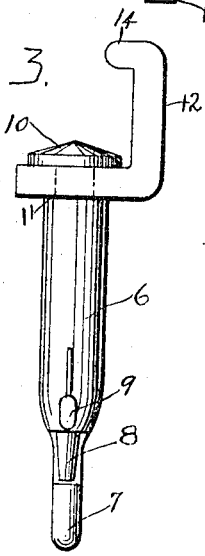
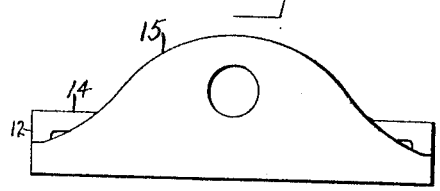
Witnesses
J. E. Strobel.
M. J. Miller.
Inventor
Raymond S. Beaver.
By
Attorneys

UNITED STATES PATENT OFFICE.

RAYMOND S. BEAVER, OF GLENWOOD, INDIANA.

SWIVEL-SNAP.

947,539.  Specification of Letters Patent.  Patented Jan. 25, 1910.

Application filed May 14, 1909. Serial No. 495,853.

*To all whom it may concern:*

Be it known that I, RAYMOND S. BEAVER, a citizen of the United States, residing at Glenwood, in the county of Rush, State of Indiana, have invented certain new and useful Improvements in Swivel-Snaps; and I do hereby declare the following to be a full, clear, and exact description of the invention, such as will enable others skilled in the art to which it appertains to make and use the same.

The invention relates to a snap hook for harness and more particularly to that class of swivel snap hooks.

The primary object of the invention is the provision of a snap hook of this character which is capable of receiving a snap so that the same will lie in a proper position to assure against injury to a draft animal and is particularly arranged or constructed for use on work harness in lieu of a dee for the hip strap thereof.

Another object of the invention is the provision of a snap hook which is simple in construction, one that possesses few parts in the finished article, one part of which is formed from a single blank cut and stamped into the desired shape in a single operation and that is thoroughly reliable and efficient in function, and inexpensive in the manufacture.

With these and other objects in view the invention consists in the construction, combination and arrangement of parts, as will be hereinafter more fully described, illustrated in the accompanying drawing which discloses the preferred form of embodiment of the invention, to enable those skilled in the art to practice the same, and as set forth in the claim hereunto appended.

In the drawings:—Figure 1 is a top plan view of the invention. Fig. 2 is a sectional view through the loop portion thereof. Fig. 3 is an end elevation. Fig. 4 is a rear elevation. Fig. 5 is a front elevation with the snap hook removed.

Similar reference characters indicate corresponding parts throughout the several views in the drawings.

In the drawings, the numeral 6, designates a shank of a swivel hook and 7 the hook proper thereof, and within the shank is mounted a slidable bolt 8, provided with a finger knob 9, which operates in the well known manner, and this bolt is spring controlled to normally close the hook proper of the swivel snap hook. The opposite end of the shank 6, is formed with a circular head 10, in rear of which in the shank is provided an annular groove 11, engaged by a loop member for the assemblage thereof with the snap hook to permit the swivel connection of the latter with said loop member which will be hereinafter described. The loop member 12, is made of a single piece of cast metal having an elongated rectangular-shaped eye 13, formed at one longitudinal edge with an offset cross bar 14, and at its opposite longitudinal edge with an ear 15 at right angles to the plane of the eye 13, and to this ear is swiveled the snap hook.

It will be apparent that when a harness strap is passed through the eye 13, to engage the cross bar 14, the said strap will have one face lie flush with one face of the said eye so as to lie flat to assure against injury to a draft animal when the snap hook is in use. Furthermore it is apparent that by the swivel connection of the snap hook with the ear 15, of the loop a strap when connected with the latter will permit the same to assume a natural position or flat against the hips of an animal.

What is claimed is:—

As an article of manufacture, a device of the class described comprising a loop formed from a single piece of metal and provided with an elongated eye having an offset cross bar and with a right angularly disposed ear and a snap hook swiveled centrally to said ear.

In testimony whereof, I affix my signature, in presence of two witnesses.

RAYMOND S. BEAVER.

Witnesses:
EDWARD HARLOW,
T. G. RICHARDSON.